United States Patent [19]

Walton et al.

[11] 4,339,261

[45] Jul. 13, 1982

[54] DRIVE SYSTEM FOR GLASS FURNACE STIRRERS

[75] Inventors: Ronald O. Walton; Orville L. Tary, both of Toledo, Ohio

[73] Assignee: Libbey-Owens-Ford Company, Toledo, Ohio

[21] Appl. No.: 185,207

[22] Filed: Sep. 8, 1980

[51] Int. Cl.³ .............................................. C03B 5/187
[52] U.S. Cl. ........................................ 65/178; 65/179; 65/180
[58] Field of Search ........................... 65/178, 179, 180

[56] References Cited

U.S. PATENT DOCUMENTS

| | | | |
|---|---|---|---|
| 2,038,800 | 4/1936 | McBurney | 65/178 X |
| 3,236,618 | 2/1966 | Allman | 65/178 |
| 3,350,187 | 10/1967 | Brichard et al. | 65/134 |
| 3,997,315 | 12/1976 | Rhodes et al. | 65/178 X |
| 4,046,546 | 9/1977 | Hynd | 65/178 X |
| 4,047,918 | 9/1977 | Heithoff | 65/178 X |
| 4,277,274 | 7/1981 | Chrisman | 65/178 X |

FOREIGN PATENT DOCUMENTS 707895  1/1980  U.S.S.R. ................................ 65/178

Primary Examiner—Arthur D. Kellogg
Attorney, Agent, or Firm—Collins, Oberlin & Darr

[57] ABSTRACT

A continuous tank-type glass melting furnace includes a melting zone into which raw materials are charged and reduced to a molten state. The molten glass then flows through a relatively narrow waist or conditioning area to refining and conditioning zones, and is then withdrawn as a continuous ribbon or sheet. Within the waist area there is provided a plurality of stirrers whose mixing and kneading action assist in homogenizing the glass as it flows through the restricted area. Each stirrer is connected to and driven by its own individual power unit so that the speed and direction of rotation of individual stirrers can be independently regulated and synchronized. Individual stirrers can also be removed and replaced with little or no interruption in operation of the remaining units.

9 Claims, 5 Drawing Figures

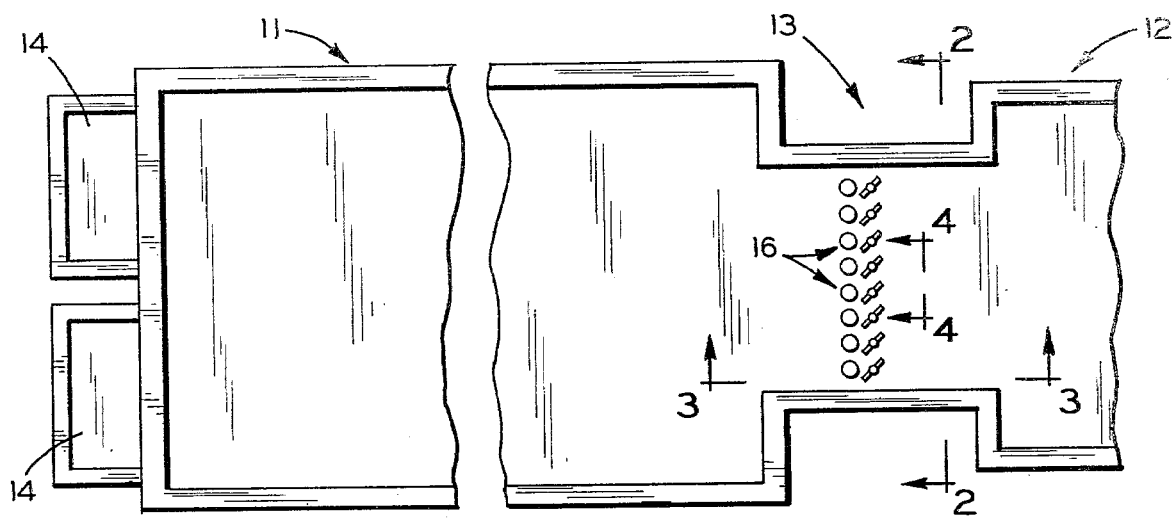
FIG. 1
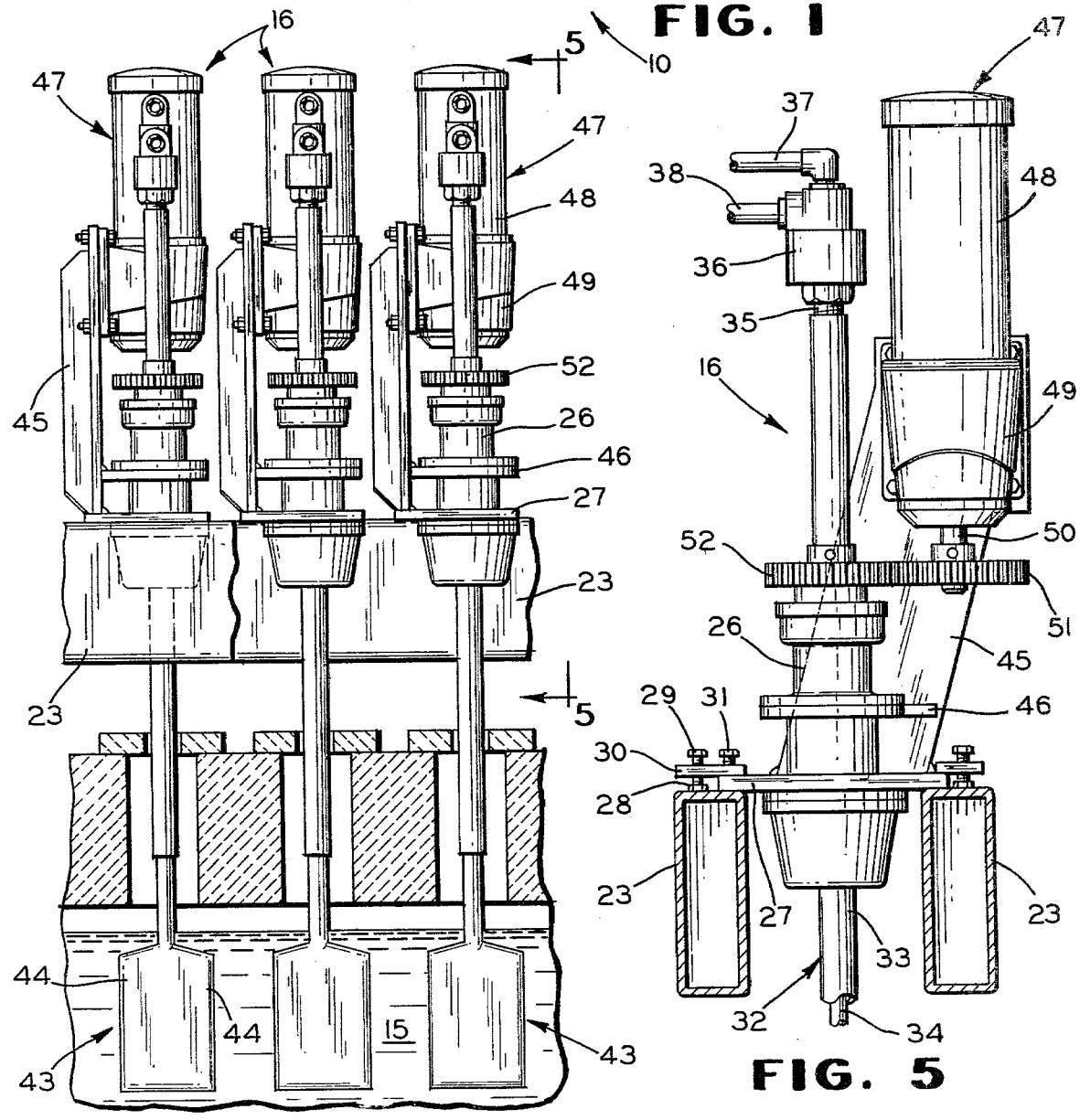
FIG. 4
FIG. 5

DRIVE SYSTEM FOR GLASS FURNACE STIRRERS

BACKGROUND OF THE INVENTION

1. Field of the Invention

The present invention relates broadly to homogenization of molten glass in a continuous glass melting furnace, and more particularly to improved drive means for stirrers employed in such homogenization. 2. Description of the Prior Art Various forms of stirrers have been employed for some time in continuous glass melting furnaces in order to improve the homogeneity of the molten mass. U.S. Pat. No. 3,236,618, for example, suggests the use of counterrotating intermeshing paddles immersed in the stream of molten glass, while U.S. Pat. No. 3,350,187 suggests the use of one or more rows of screw-type agitators or propellers extending across the stream for setting up vertical currents to intermix the molten mass.

More recently, for purposes of further improving homogenization as illustrated by U.S. Pat. Nos. 3,997,315 and 4,046,546, glass melting tanks have been constructed with relatively narrow sections or waists through which the glass flows from the melting and refining areas to the conditioning zone. The stirrers are located in a line across this waisted area and rotated about their vertical axes so as to, in combination with the flow characteristics created by the tank construction, significantly improve the homogeneity of the molten glass delivered to the working area of the facility.

Conventionally, in order to permit synchronized operation of the stirrers and allow the power source to be located away from the intense heat of the waist area, they have been driven as by connection to a line shaft operated by a common power source such as a hydraulic or electric motor. The aforementioned U.S. Pat. Nos. 3,350,187, 3,997,315 and 4,046,546, for example, illustrate schematically such drive systems. While such drive trains provide synchronization of both speed and relative angular position of the individual stirrers, they do present certain limitations.

Thus, it occasionally becomes necessary to remove and replace one of the individual stirrers. To accomplish this, it is necessary to discontinue operation of the entire group of stirrers while the faulty unit is replaced. Changing the relative speed, direction of rotation or relative angular position of individual stirrers likewise requires disruption of the entire stirring process. Should a malfunction occur anywhere in the drive train, all of the stirrers will discontinue operation. In spite of the inherent limitations, it was previously deemed of sufficient importance for the stirrers to be synchronized and the power source to be in a less hostile environment that the heavy, cumbersome common drive was employed.

SUMMARY OF THE INVENTION

In accordance with the present invention, the restricted waist area of a continuous glass melting furnace is provided with a plurality of vertically oriented stirrers for assisting in homogenization of the molten glass passing therethrough. Each stirrer is driven by its own individual synchronous motor, with operation of the motors being correlated to synchronize the stirrers and achieve the desired homogenizing effect upon the molten glass. Each stirring unit is independently connected to electrical and liquid coolant sources so that either the motor alone or the entire unit can be easily installed and/or removed with little or no interference in the operation of the remaining units. Means is provided for selectively supplying cooling air both for the drive units and for persons working in the area of the drive units.

It is, therefore, a primary object of the invention to provide an improved drive system for stirrers in a glass melting furnace.

Another object of the invention is to provide such a system in which each stirrer is driven by its own power unit independently of the other stirrers.

Another object of the invention is to provide such a drive system in which individual stirring units can be installed and/or removed with little or no interference in the operation of the remaining units.

Another object is to provide a drive system which is relatively simple, durable and easily maintained.

It is still another object of the invention to provide a drive system which permits greater flexibility in control of the stirring units to adapt the stirring to changing operating conditions.

Other objects and advantages will become more apparent during the course of the following description, when taken in connection with the accompanying drawings.

BRIEF DESCRIPTION OF THE DRAWINGS

In the drawings, wherein like numerals refer to like parts throughout;

FIG. 1 is a plan view of a typical glass melting furnace incorporating the invention;

FIG. 4 is an enlarged fragmentary transverse sectional view taken substantially along line 4—4 of FIG. 1; and FIG. 5 is an enlarged end view, partially in section, taken substantially along line 5—5 of FIG. 4.

DESCRIPTION OF THE PREFERRED EMBODIMENTS

Figure 2:
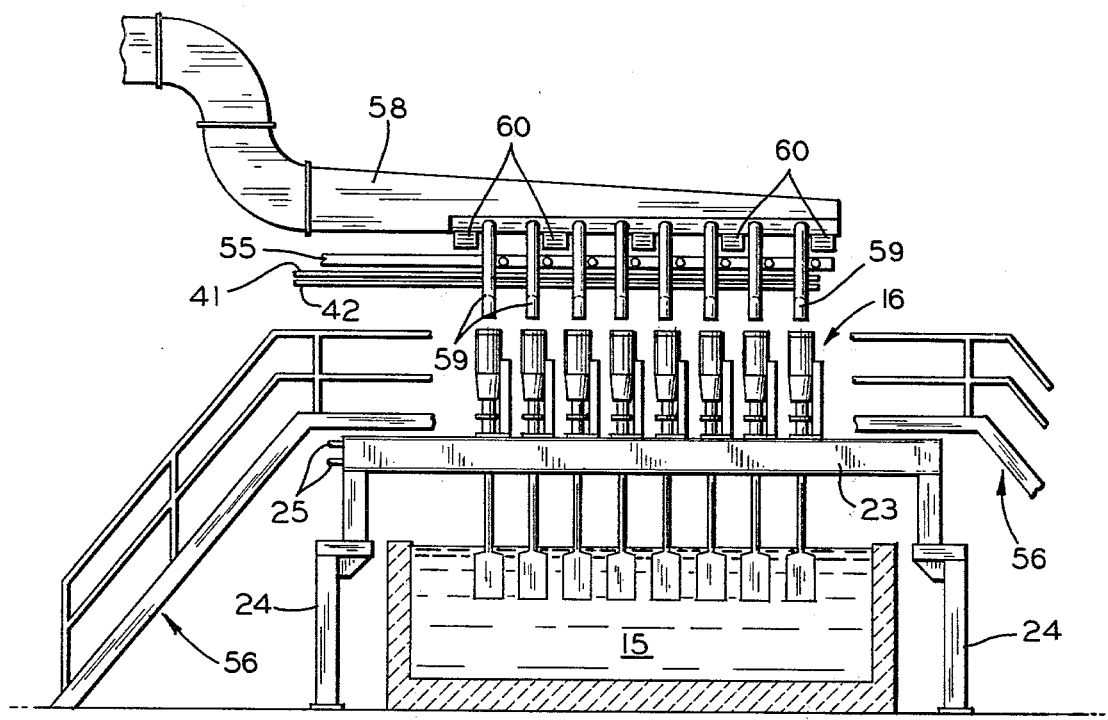
FIG. 2 is a transverse elevational view taken substantially along line 2—2 of FIG. 1.
Figure 3:
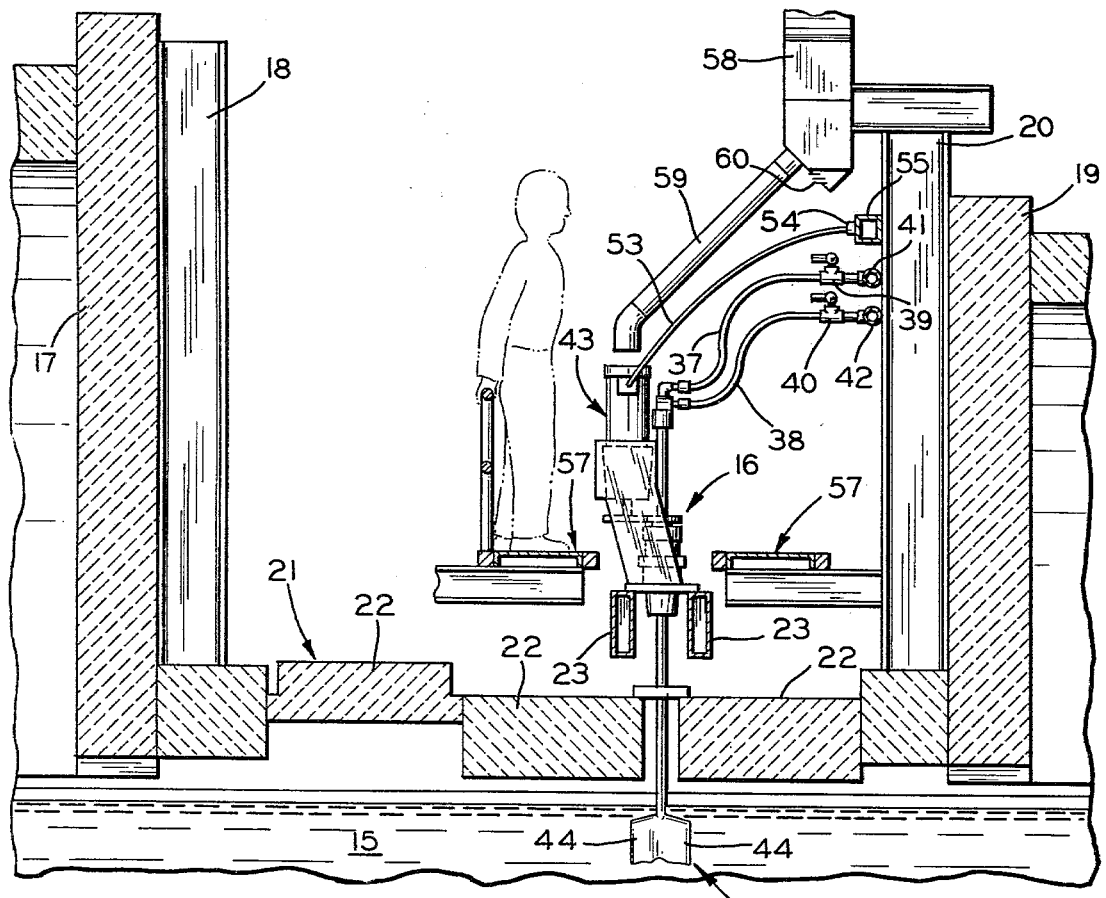
FIG. 3 is a longitudinal elevation taken substantially along line 3—3 of FIG. 1.

Referring to the drawings, there is shown generally in FIGS. 1, 2 and 3 an installation of the type in which stirrers driven in accordance with the invention may advantageously be employed. Thus, as best illustrated in FIG. 1 a typical continuous glass melting tank 10 includes a melting section 11 and a working section 12 interconnected by a narrower waist section 13. In the well known manner, raw glass making or batch materials and scrap glass or cullet are deposited through feeding extensions or doghouses 14 upon the mass of molten glass 15 contained within the tank. The glass making materials and cullet are carried by the molten glass into the melting section 11 where they are subjected to heat as from burners (not shown) located along either side so as to become molten and integrated into the molten mass 15. The molten glass flows through the waist section 13 into the working section 12 where it is properly cooled and conditioned, and is then withdrawn therefrom through an appropriate outlet (not shown) for formation into a continuous sheet or ribbon by any of the conventional float, plate or sheet glass forming techniques.

Within the waist section 13 of restricted cross section there is located a plurality of stirring units 16 mounted for rotation of their paddles about vertical axes with their lower extremities immersed in the molten glass. The rotating stirrers, in conjunction with the flow pattern created by the reduced cross section of the waist section, provide a mixing and kneading action which serves to homogenize the molten glass and thereby to improve the quality of the finished product.

As best shown in FIG. 3, the waist section 13 within which the stirrers are located lies between a melting end waist wall 17 suspended as from structural framework 18 and a working end waist wall 19 suspended as from structural beams 20. Closely spaced above the surface of the molten glass 15 within the waist section is a flat cover 21 comprised of refractory sections 22 suspended in conventional fashion from transversely extending supports (not shown).

The stirring units 16 are carried between a pair of spaced tubular structural members 23 extending across the waist section 13 and supported at their ends upon pedestals 24 alongside the section. Couplings 25 are provided at one end of the tubular members 23 for circulating a heat absorbing medium therethrough in conventional fashion from a source (not shown).

Each of the stirring units 16 includes a journal assembly 26 affixed to a base plate 27. The base plate is adapted to rest upon the spaced tubular members 23 for mounting the stirring units in operative position. The stirring units may be secured in place as by clamps including threaded nuts 28 attached to the tubular members, with studs 29 threaded into the nuts and carrying thereon a clamping bar 30. A set screw 31 threaded through the clamping bar bears against the base plate 27 to urge it into engagement with the top of the corresponding tubular member.

Extending through and rotatably supported within the journal assembly 26 is a stirring element 32. More particularly, the stirring element comprises a sleeve 33 extending through the journal assembly and within which is secured inner and outer concentric tubular members or pipes 34 and 35, respectively, having a rotary coupling 36 at their upper end. Inlet and outlet lines 37 and 38, respectively, are connected to the rotary coupling by means of which a heat absorbing liquid, generally water, is admitted to the inner pipe 34 to flow to and circulate through the submerged portion of the stirring element and thereafter into the annular space between the inner and outer tubular elements for return flow and discharge through the outlet line 38 in the well-known counterflow manner. In order to facilitate insertion and removal of the stirring units 16 during continuing operation of the melting tank, the lines 37 and 38 are connected through individual shutoff valves 39 and 40 to inlet and outlet manifolds 41 and 42, respectively, which supply and remove the heat absorbing liquid.

The portion of the stirring element adapted to be immersed within the molten glass may take various forms as typified, for example, by those disclosed in the aforementioned U.S. Pat. Nos. 3,997,315 and 4,046,546, as well as U.S. Pat. No. 4,047,918. In the embodiment illustrated herein the tubular members 34 and 35 are connected to a paddle 43 just below the surface of the molten glass, the paddle including outwardly projecting wings 44 for laterally displacing the molten glass as the stirring element 32 rotates.

Extending upwardly from and affixed to the base plate 27 is a mounting bracket 45. The mounting bracket is connected to a flange plate 46 of the journal assembly 26 some distance above the base plate 27 for purposes of rigidity, and carries a drive or power unit 47 at its upper end. Each drive unit comprises a synchronous motor 48 and gear reduction unit 49. Affixed to the output shaft 50 of the reduction unit is a spur gear 51 which intermeshes with a similar gear 52 affixed to the sleeve 33 of the stirring element 32 for rotating the stirring element. The synchronous motors 48 are connected through wiring harness 53 and readily disengageable connectors 54 to a power supply system 55 extending across the waist section 13. Suitable conventional controls (not shown) are provided for regulating the operation of the individual synchronous motors through the power supply system.

In order to provide access by workers for servicing purposes, stairways 56 (FIG. 2) leading to catwalks 57 (FIG. 3) may be provided on either side of the line of stirring units 16. Due to the high temperatures encountered in the area, cooling of the drive units 47 is advisable to extend their normal service life. To this end, an air plenum 58 is provided above the waist section 13, with individual ducts 59 leading from the plenum to each of the stirring units 16. The plenum is connected to a blower (not shown) for providing a continuous supply of ambient cooling air under pressure. The ducts 59 direct cooling air onto and around each of the individual drive units 47. In addition, louvered outlets 60 are provided along the lower portion of the air plenum which may be opened and adjusted as necessary to direct cooling air toward workers on the catwalks 57 engaged in servicing, repairing or replacing the stirring units.

It will be apparent that through the use of suitable conventional electrical controls the stirring units of the present invention, driven by individual synchronous motors, can be operated at the desired rate of rotation, either in phase with one another as illustrated in FIG. 1, or out of phase to increase attenuation as described in the aforementioned U.S. Pat. No. 3,997,315. In addition, by simply reversing polarity, selected ones of the stirring units can be rotated in opposite directions where desired.

Should it become necessary, individual stirring units can be removed by disconnecting the wiring harness 53 at the connector 54 and loosening the set screw 31. When the stirring element 32 has been lifted from the molten glass, the valves 39 and 40 can be closed to stop the flow of coolant and the inlet and outlet connections 41 and 42 uncoupled, thereby permitting the entire unit 16 to be removed and replaced.

It is to be understood that the form of the invention herewith shown and described is to be taken as a preferred embodiment of the same, but that various changes in the shape, size and arrangement of parts may be resorted to without departing from the spirit of the invention.

We claim:

1. In a continuous tank-type glass melting furnace having a plurality of stirrers arranged in at least one row extending transversely across a section of said furnace for homogenizing molten glass as it flows through said furnace, each said stirrer including a stirring member for immersion in the molten glass, a rotary shaft extending upwardly from the stirring member through a cover over the molten glass, means mounting said shaft for rotation about its longitudinal axis, and drive means connected to said shaft for rotating said stirring member, the improvement wherein said drive means includes an individual power unit connected to said shaft of each said stirrer for driving each stirrer independently of the others, said individual power unit comprising a synchronous electric motor and control means for each said stirrer whereby rotation of individual stirrers relative to one another in said at least one row of stirrers may be synchronized.

2. A continuous tank-type glass melting furnace as claimed in claim 1, including means for circulating a heat absorbing medium through said stirrers.

3. A continuous tank-type glass melting furnace as claimed in claim 2, wherein said means for circulating a heat absorbing medium comprises inlet and outlet manifolds extending across said furnace, lines detachably connecting each said stirrer to said inlet and outlet manifolds, and valves in said lines whereby the flow of heat absorbing medium through the individual stirrers can be shut off to permit removal thereof.

4. A continuous tank-type glass melting furnace as claimed in claim 1, wherein each said power unit comprises a gear reduction unit connected to said motor, a spur gear on the output shaft of said reduction unit, and an intermeshing spur gear affixed to said upwardly extending shaft.

5. A continuous tank-type glass melting furnace as claimed in claim 4, including a wiring harness extending across said furnace and means disengageably electrically connecting each said synchronous motor to said wiring harness.

6. A continuous tank-type glass melting furnace as claimed in claim 1, including means directing a supply of cooling air onto each said synchronous motor.

7. A continuous tank-type glass melting furnace as claimed in claim 4, including means for circulating a fluid heat absorbing medium through said stirrers comprising a rotary coupling member on each said upwardly extending shaft, inlet and outlet manifolds extending across said furnace for carrying heat absorbing fluid, conduit means detachably connecting said rotary couplings to said inlet and outlet manifolds for circulating heat absorbing fluid through said stirrers, and valve means operable to shut off the flow of heat absorbing fluid through said connecting conduits whereby said stirrers can be individually removed from operation.

8. A continuous tank-type glass melting furnace as claimed in claim 2 or claim 7, including a pair of spaced structural members extending transversely across said furnace for supporting said stirrers in spaced relation therealong, each said stirrer including a base plate resting on said structural members and spanning the space therebetween, a journal assembly affixed to said base plate through which said rotary shaft extends, and a mounting bracket extending upwardly from said base carrying said power unit at its upper end.

9. In a continuous tank-type glass melting furnace having a plurality of stirrers for homogenizing molten glass as it flows through said furnace, each said stirrer including a stirring member for immersion in the molten glass, a rotary shaft extending upwardly from the stirring member through a cover over the molten glass, means mounting said shaft for rotation about its longitudinal axis, and drive means connected to said shaft for rotating said stirring member, the improvement wherein said drive means includes an individual power unit connected to said shaft of each said stirrer for driving each stirrer independently of the others, said individual power unit comprising a synchronous electric motor for each said stirrer whereby rotation of individual stirrers relative to one another may be synchronized, a gear reduction unit connected to said motor, a spur gear on the output shaft of said reduction unit, and an intermeshing spur gear affixed to said upwardly extending shaft, and including means directing a supply of cooling air onto each said synchronous motor.

* * * * *